Feb. 5, 1963 J. A. MURRAY ET AL 3,076,341
AUTOMATIC VOLUMETRIC SAMPLER AND AUTOMATIC MATERIAL TRANSFER
Filed Sept. 30, 1959
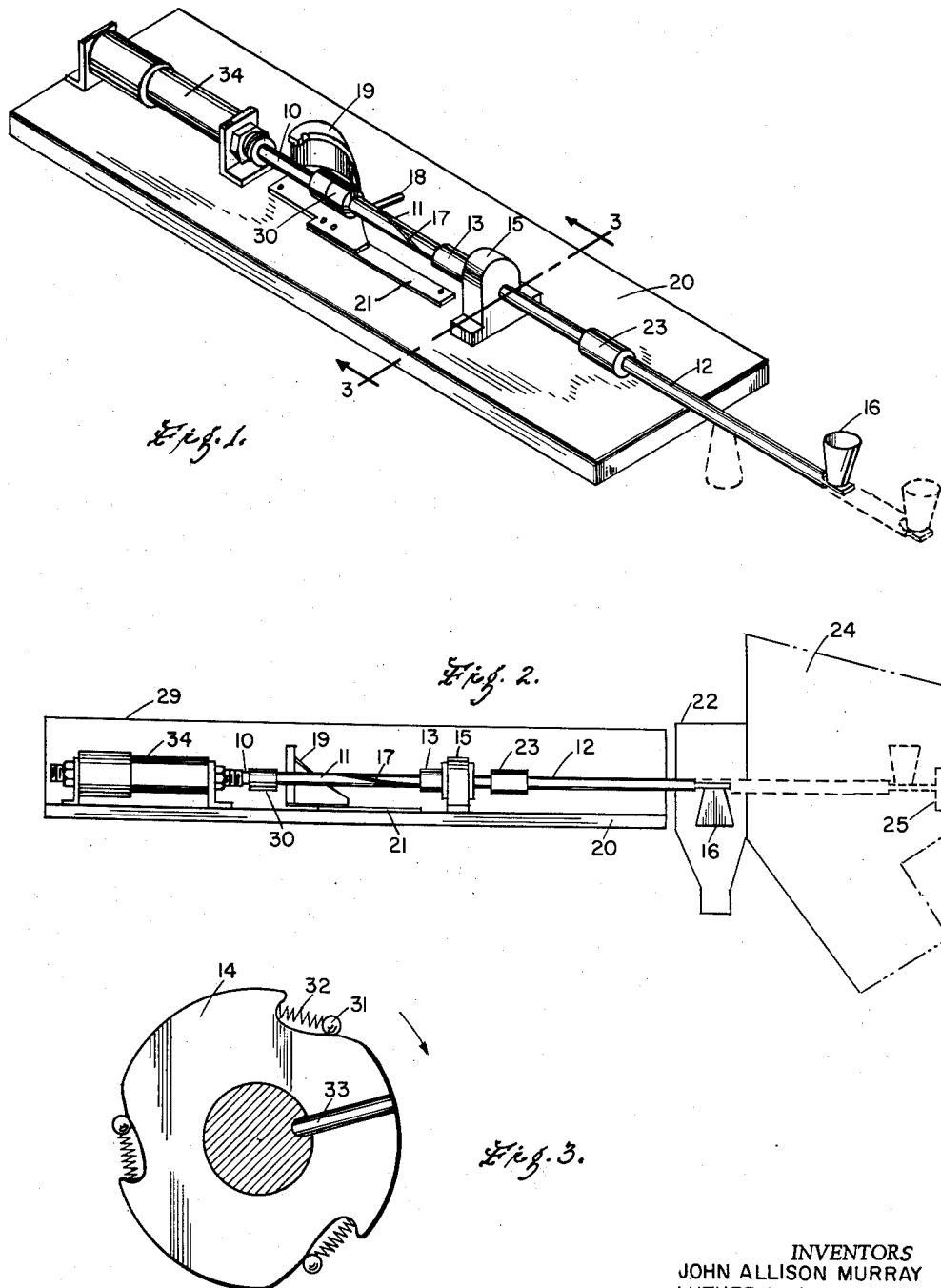
INVENTORS
JOHN ALLISON MURRAY
LUTHER L. SIFFORD SR.
BY
*William Kammerer*
ATTORNEY

United States Patent Office 3,076,341
Patented Feb. 5, 1963

3,076,341
AUTOMATIC VOLUMETRIC SAMPLER AND AUTOMATIC MATERIAL TRANSFER
John A. Murray, Cheshire, and Luther L. Sifford, Sr., Mount Carmel, Hamden, Conn., assignors to American Cyanamid Company, Stamford, Conn., a corporation of Maine
Filed Sept. 30, 1959, Ser. No. 843,539
3 Claims. (Cl. 73—423)

This invention relates to an improved material transfer device. More particularly, this invention relates to an improved automatic device advantageously adapted for continuously withdrawing samples of liquid or granular material gravitationally flowing through a confined passage. In narrower aspects, the present invention concerns a sampling device for obtaining continuous representative samples or thiefs of comminuted or granulated material descending through a product chute.

Many manufacturing processes, particularly those of a chemical nature, require close and substantially continuous control of operating conditions. In such processes it is often necessary to obtain frequent or continuous samples of material being processed for the purpose of analysis and control. For instance, in the manufacture of decorative thermosetting aminoplast resin molding compositions, e.g., melamine resin impregnated fillers, it is desirable and oftentimes required that the final form of the material be not only granular in nature but that the product particle sizes be proportionally distributed over a certain specification range. Accordingly, it is essential that the granular molding product be continuously analyzed so that it will be possible to effect the desired uniformity of product, or more aptly, to obtain a certain desired granular composite.

In the manufacture of granular aminoplast molding compositions, the final product is ultimately discharged into large capacity containers. The prior art method commonly employed to test or control the granular product consists of taking samples from the container as the product is introduced therein by means of a thief or a scoop. This manner of analyzing granular materials is far from being satisfactory in that it is substantially impossible to obtain samples of the material which are indicative of the constituent make-up of product entering the container. This method is fairly useful in determining the overall composition of any given accumulation of the final product. However, as stated it is virtually impossible to utilize this commonly practiced prior art method to effect continuous analysis of the product being manufactured and thus be in a position to change processing details as conditions may dictate.

We have devised an improved sampling device for continuously withdrawing a small sample of product, and more specifically, small samples of a granular product gravitationally passing through a product chute. The new sampling device comprises a spindle or rod having a receptacle affixed to one end thereof. The spindle is actuated by means capable of moving the spindle forwards and backwards along its longitudinal axis. Our device further includes means causing the spindle to rotate in a controlled pattern while undergoing a cycle of reciprocation. The rotational pattern experienced by the spindle during its forward stroke is such that the receptacle affixed to one end of the spindle moves from a non-collecting position to a vertical material receiving position as it moves forward through a cross sectional area of the product chute through which the product desired to be sampled is gravitationally flowing. The sampler is adapted for retaining the receptacle in a vertical receiving position as it moves backwards on its longitudinal axis during the time it is within the product chute and just subsequent to the time the receptacle emerges from the product chute. As the receptacle leaves the product chute means associated with our device cause the receptacle to invert in a relatively rapid fashion to discharge the collected material existing in the receptacle and thus be in position to commence another reciprocal cycle.

A particularly advantageous embodiment of our new sampling device is described below in connection with the accompanying drawings, in which:

FIGURE 1 is a perspective view of the new sampling device;

FIGURE 2 is a side view of the device showing a position relationship between it and a product chute compartment and a sampler compartment chute. This figure also depicts the positions of the receptacle at near the extremities of its longitudinal excursion; the solid outline of the receptacle indicating its position when discharging contents and the dotted outline illustrates the vertical material receiving position, and FIGURE 3 is a cross section taken substantially along the line 3—3 of FIGURE 1.

The automatic sampling device comprises a double acting air pressure cylinder 34 and piston 10 which actuates the intermediate spindle 11 through a rotary coupling 30. The intermediate spindle is attached to an extension spindle 12 through the coupling 23. The intermediate spindle 11 runs through a supporting sleeve bearing 13 integral with the clutch housing 15. The clutch housing contains an overriding clutch 14. The extreme end of the extension spindle is fitted with a receptacle 16, which receptacle is readily interchangeable. The intermediate spindle at a point approximate to rotary coupling is provided with a pin 18. The intermediate spindle is additionally provided with a helical groove flight 17 which is so constructed to accommodate the pin 33 of the overriding clutch 14.

The overriding clutch assembly is conventional in nature and consists of a stationary housing member 15 attached to base 20 and containing the overriding clutch member 14 capable of axially rotating in one direction only. The overriding clutch member 14 contains a plurality of ball bearings 31 confined in ellipsoidal-like depressions disposed on the periphery thereof. The ball bearings are permanently held in contact with the braking surface of the clutch housing member 15 by means of spring 32.

Parallelly disposed to the longitudinal axis of the intermediate spindle and in juxtaposition therewith is a guide member consisting of a flat spring plate 21 attached to the base 20. The guide member provision is optional but nevertheless represents a desirable feature of our preferred embodiment. At the end of the flat spring plate 21 is a barrel cam 19.

In describing a mode of operation of our sampling device as shown in the accompanying drawings, it will be assumed that the receptacle 16 is in the upside down position within the sample chute 22 as shown by the dotted outline of the receptacle in FIGURE 2. In this stated position of the receptacle, the spindle assembly consisting of 11 and 12 is at the extremity of its backward excursion. As the piston 10 of the air pressure cylinder 34 proceeds outwardly, forward motion is imparted to said spindle assembly. At the inception of the forward motion of the spindle assembly, the helical groove flight 17, as shown disposed on the intermediate spindle 11, imparts a force on the pin 33 of the overriding clutch 14. Said force causes the overriding clutch 14 to attempt rotation in a direction opposite to the axial disposition of the helical groove contained by the spindle. This application of force causes the ball 31 of the overriding clutch 14 to wedge between the overriding clutch and the clutch housing 15 surface, thereby axial rotation of the overriding clutch is substantially immediately arrested. Accordingly, pin 33 of the overriding clutch remains in a stationary position while the spindle is axially and at the same time longitudinally progressing through its forward stroke. During the forward stroke of the spindle, the pin 33 as stated continuously assumes a fixed position and thus cooperates with the helical groove causing the spindle to rotate in a counterclockwise direction when the device is viewed from the front or receptacle end.

During that part of the forward stroke when the receptacle is still within the sample chute compartment 22, the receptacle 16 revolves approximately 90°. As the receptacle enters the product stream compartment 24, the receptacle revolves from a horizontal to a vertical position, i.e., additional 90°; this latter movement taking place while the receptacle longitudinally moves through the product stream. In this manner the mouth of the receptacle revolves in an arc which gradually permits an accumulation of the product during the total excursion of the receptacle within the product stream. Advantageously, the helical or spiral groove is so designed that the first part of the 90° rotation within the sample chute is relatively fast, but uniformly so, in relation to the horizontal distance traveled, whereas the last part of the 90° rotation occurring in the product chute is compartively slow. Additionally or alternatively, the shape of the receptacle may be advantageously designed so as to facilitate a representative accumulation of the sampled product during the excursion of said receptacle within the product chute. In other words, instances may be encountered wherein the particle size distribution of the product passing through the chute is not uniform throughout the cross-sectional length of the product chute. In those instances, once the size distribution pattern is ascertained, the helical pitch of the spindle governing the rotation of the receptacle within the product chute may be suitably designed so as to effect an accumulation of a sample which is reasonably representative of through-put of the product. As indicated, the shape of the receptacle may be altered so as to faciiltate in a supplementary fashion the acquisition of representative samples.

The extent of the forward excursion of the receptacle is halted as the piston 10 commences to retract within the air cylinder housing 34. During the backward excursion of the spindle, the receptacle remains in vertical material receiving position and the overriding cluch is free to rotate in a clockwise direction when the device illustrated herein is viewed from the front or receptacle end. The frictional forces existing between the spindle and the sleeve bearing among other component parts are sufficient to keep the receptacle in a vertical position while the receptacle exists within the product chute during the backward excursion of the spindle.

The pin 18 affixed to the intetmediate spindle 11 at the proximity of the rotary coupling 30 is in a substantially upright position at the commencing of the forward stroke. Thus during the forward excursion of the spindle the pin revolves 180° and remains fixed in the assumed substantially downward position during the backward excursion of the spindle. Near the end of the backward stroke, said pin 18 engages the barrel cam 19 and the receptacle is caused to invert rapidly to its original upside down position and thereby the contents thereof are discharge into the sample chute. The entire cycle is then repeated.

Optionally, our device is provided with a flat spring plate guide 21 parallelly disposed to the longitudinal axis of the intermediate spindle and in juxtaposition therewith. As the pin 18 revolves in assuming its downward position, the pin crosses over the spring plate surface. Approximately simultaneous upon contact of the pin with the guiding edge of the plate spring, the spindle begins its backward excursion. Thus the presence of the spring plate merely assures that the pin will properly engage the specific cam design shown herein. The barrel cam 19 effects quick revolution of the receptacle to the original upside down position and the entire cycle is then repeated.

An electrical timer not shown in the accompanying drawings may be used to control the frequency of the strokes or alternatievly, standard electrical contacts supplied with a weigh scale may be utilized to activate the sampling device in relationship to increments of a fixed number of pounds being discharged through the product chute compartment. Also it is desirable that the air cylinder contain standard adjustments regulating the air pressure and thus enabling the forward and return stroke speeds to be controlled independently. Optionally the whole assembly may be fitted with a dust cover 29. Also optionally, when it is intended that the receptacle remain at rest in the sample chute compartment for any length of time, a gate 25 affixed to a further extension provided to the spindle may advantageously serve to isolate the sample and product stream compartments, thus reducing leakage.

Sampling devices constructed in accordance with our invention have been successfully employed to effect volumetric transfer of solids other than the granular molding compositions as aforedescribed and even liquids from one stream to another. Thus they may be beneficially employed in such operations as adding back rework, adjustment of screen analysis, adding color or pigment, adding seasoning, adjustment of blends, etc. Another advantageous attribute of our invention is to be especially realized where a particular sensitivity of the product to be sampled or transferred represents a consideration. For example, in sampling melamine resin molding powders the use of rifflers, thiefs and the like may adversely affect the nature of the powder, whereas the use of our sampling device has no perceptible adverse effect upon such sensitive materials.

We claim:

1. A device for sampling material from a conduit comprising: a spindle and a receptacle rigidly affixed to one end thereof, said receptacle being substantially smaller than said conduit, means to move said spindle forward and back along its longitudinal axis, means to rotate said spindle as the spindle moves forward thereby causing said receptacle to rotate in a controlled pattern through a 90° arc from a horizontal, non-receiving position to a vertical, material receiving position during the total excursion of said receptacle through a product stream, means to cause said receptacle to remain in material receiving position as said spindle moves backwards on its longitudinal axis to near the end of its stroke and means to invert said receptacle to discharge material therefrom at a point adjacent to the back end of the backward stroke of said spindle.

2. An automatic transfer device comprising: a spindle adapted to move back and forth along its longitudinal axis and having a receptacle affixed on one end thereof, said spindle engaging an axially positioned overriding clutch permitting the spindle to rotate in one direction only, said spindle provided with helically disposed means cooperating with said clutch causing said receptacle to rotate in a controlled pattern through a 90° arc from a horizontal, non-receiving position to a vertical, material receiving position during the total excursion of said receptacle through a product stream, a pin projecting from and so positioned on said spindle so as to engage, at approximately the extremity of the backward excursion of said spindle, a cam whereby said spindle is rotated so as to revolve said receptacle to its original position.

3. An automatic sampling device comprising: a spindle adapted to move back and forth along its longitudinal axis and having a receptacle affixed on one end thereof, said spindle engaging an axially positioned overriding clutch permitting the spindle to rotate in one direction only, said spindle provided with a helically disposed groove flight cooperating with said clutch causing said receptacle to rotate in a controlled pattern through a 90° arc from a horizontal, non-receiving position to a vertical, material receiving position during the total excursion of said receptacle through a product stream, a pin projecting from and so positioned on said spindle so as to engage at approximately the extremity of the forward excursion of said spindle a flat spring guide member parallel to and in juxtaposition with the longitudinal axis of the spindle, a barrel cam positioned adjacent to the end of said guide member and engaging said pin near the end of the backward excursion of said spindle so as to return the receptacle to its original position.

References Cited in the file of this patent

UNITED STATES PATENTS 2,683,373    Gallup et al. _____ July 13, 1954

FOREIGN PATENTS 1,180,391    France _____ Dec. 29, 1958